Nov. 5, 1968  H. J. BRUDNER  3,408,749
BRANCHING-INSTRUCTION TEACHING DEVICE
Filed April 11, 1967  2 Sheets-Sheet 1
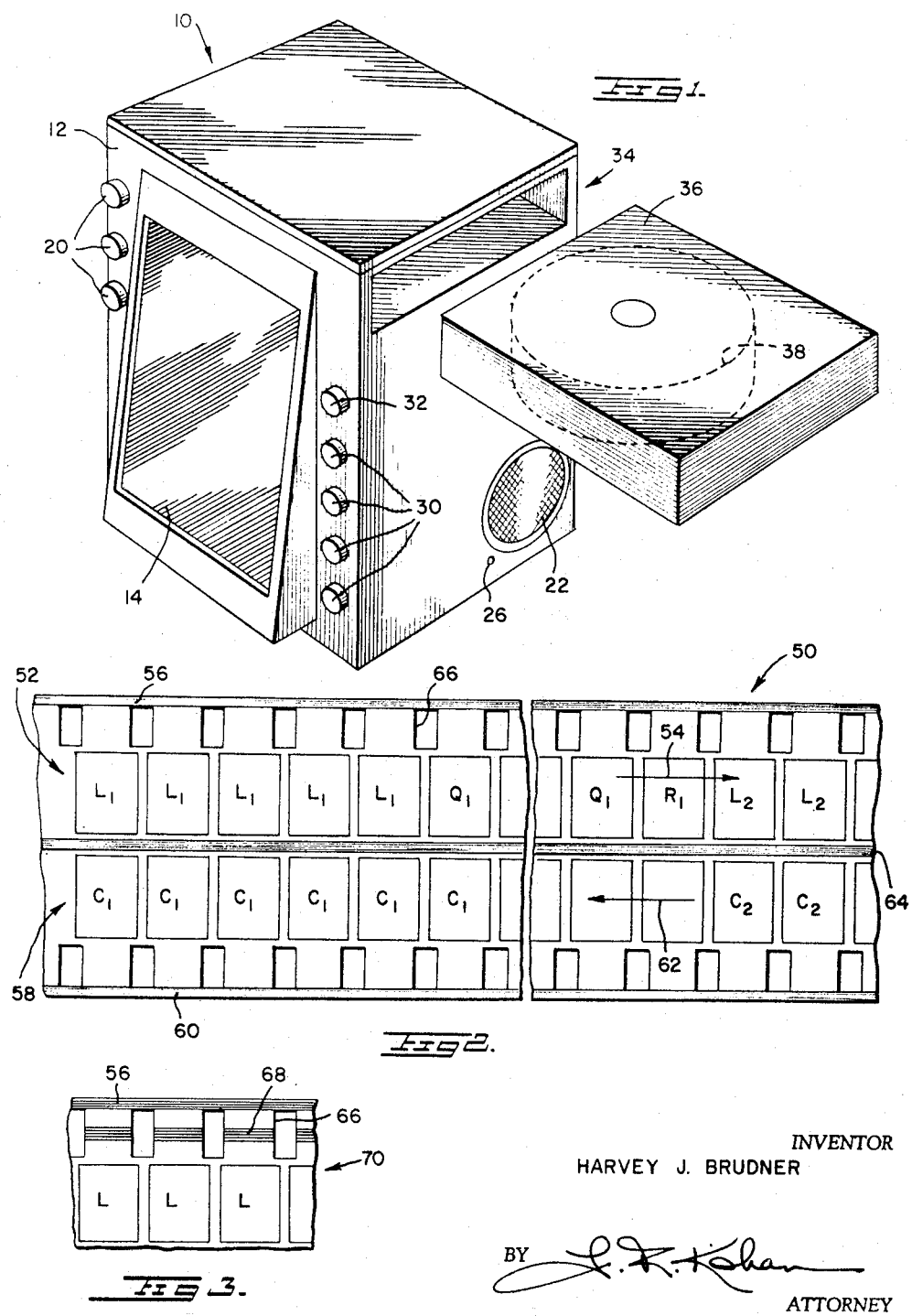
INVENTOR
HARVEY J. BRUDNER
BY
ATTORNEY Nov. 5, 1968          H. J. BRUDNER          3,408,749
BRANCHING-INSTRUCTION TEACHING DEVICE
Filed April 11, 1967          2 Sheets-Sheet 2
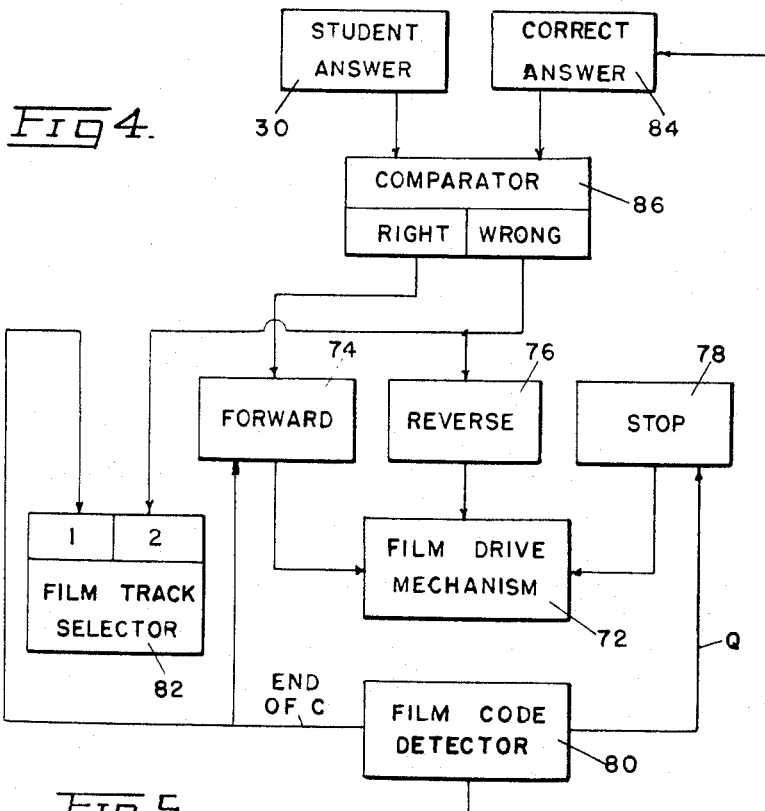
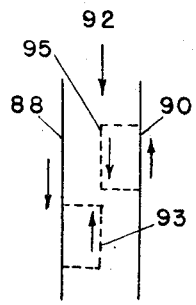
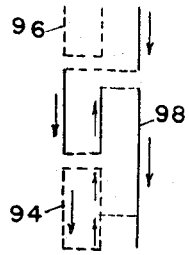
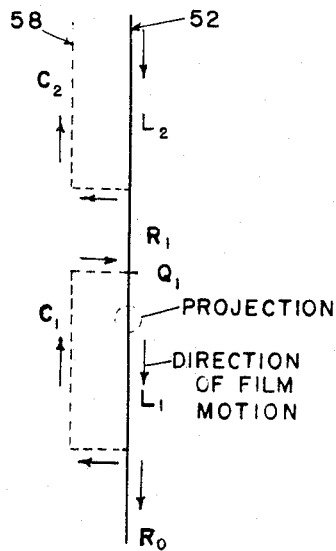
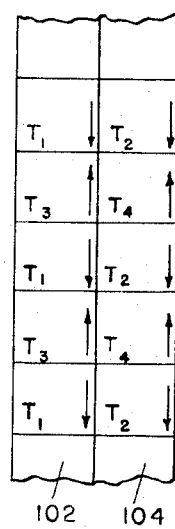
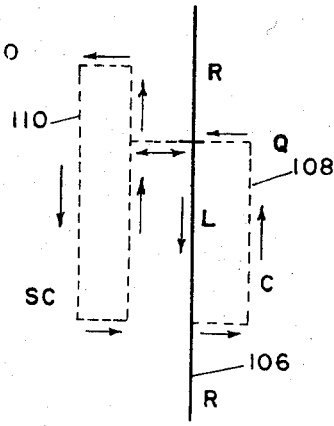
INVENTOR
HARVEY J. BRUDNER
ATTORNEY United States Patent Office 3,408,749
Patented Nov. 5, 1968

3,408,749
BRANCHING-INSTRUCTION TEACHING DEVICE
Harvey J. Brudner, Piscataway, N.J., assignor to American Can Company, New York, N.Y., a corporation of New Jersey
Continuation-in-part of application Ser. No. 534,843, Mar. 16, 1966. This application Apr. 11, 1967, Ser. No. 656,962
15 Claims. (Cl. 35—9)

ABSTRACT OF THE DISCLOSURE

A sound-motion-picture teaching machine presents lessons each terminating in a question. Upon entry of an incorrect student answer, supplemental instruction is thereupon presented, followed by repetition of the question. The supplemental material is recorded on the film in a manner permitting this branching type of instruction without interruption of the visual presentation. Advantages may be partially obtained in teaching devices employing other visual reproduction media.

---

This is a continuation-in-part of an application of the same inventor, Ser. No. 534,843, now abandoned, filed Mar. 16, 1966. This invention relates to branching-program teaching devices, and particularly to audio-visual teaching machines in which lessons are presented to the student as sound motion pictures, with provision for the presentation of auxiliary or remedial instructional material in the event it is needed by the student.

Programmed teaching devices are generally designed to perform, to a greater or lesser degree, functions normally performed by a human instructor, the most basic being the presentation of expositional instruction material with frequent or occasional interruption for testing of the student's learning. A variety of devices of this general type have been developed, with a wide spectrum of differences in construction, appearance, cost, and capability. In their simplest form, such devices may closely resemble mere textbooks, while at the other extreme, such devices may employ digital computers with complex input and output devices at student terminals. The term "programmed" more or less loosely distinguishes the method or technique of instructorless teaching with rate of progression governed by student responses to tests of learning frequently appearing in the pre-recorded lesson material from others.

In general, any type of device which can be used for communication of conventional recorded instructional information (textbooks, slides, motion-pictures, audio recording, etc.) may also be employed for programmed instruction, the primary basic difference of the latter being the interruption of the presentation for learning tests and evaluation of the responses of the student. In the simplest type of programmed teaching device, an arrangement is merely made for displaying the correct answer to the student for his own comparison with his answer. In programmed teaching devices which provide for entry of answers by the student for automatic comparison, the questions, and the answer-entry provision, are normally of the multiple-choice type, both for simplicity of structure and for ease of entry by the student.

There are certain general forms or types of programs which are more or less related to the wide differences which exist in the complexity of programmed teaching devices. The simplest of such program types is the "linear" program, in which the recorded information is presented to the student in fully fixed order. Each body or sequence of expositional material is followed by questions or similar test material. Such a fixed program is sometimes called "non-adaptive," i.e., unchanging (except as to presentation timing) despite variation in needs of particular students. Such programs are normally used only for very limited types of instructional material.

A program in which the answer given by the student alters the material to be thereafter presented is normally known as "branching" or "adaptive." Obviously, a wrong answer shows a requirement for some form of supplementary instruction, and the incorporation of provision for giving of such auxiliary or supplementary instruction is vital to any self-teaching device for general-purpose use. In teaching systems employing such complex equipment as digital computers, wherein information is in any event normally stored in a form permitting substantially immediate access to any given material, such provision is relatively simple. In the more conventional, and less expensive, types of equipment for presenting recorded information, the imposition of a branching requirement can raise serious problems, the magnitude of which varies considerably with the recording medium employed. In certain cases, notably motion-picture film presentation, great complication of the equipment has heretofore been required to perform this function in a manner which provides the continuity of presentation normally required for fully acceptable use.

Unlike such complex devices as digital computers with random-access storage, ordinary types of devices for sensory presentation of recorded instructional information normally are highly unsuitable for presentation of recorded material in any order other than the order of appearance of the information at a station or point past which the medium is progressed, i.e., the access to recorded information is serial, rather than random. It is possible, of course, to insert auxiliary material between the end of the lesson to which it pertains and the commencement of the next lesson, and this has frequently been done. However, this makes it necessary, when the student makes a correct answer, to introduce a long gap in presentation if the progression of the medium is continued at the same speed which would be used were the auxiliary material required to be presented to the student. Where the speed used in skipping the undesired material can be made sufficiently high to introduce no observable discontinuity, such an approach can be considered satisfactory.

The difficulty of employing the selective skipping of parts of the recorded material for the provision of branching varies greatly with the recording medium employed. Where the medium is of the static, rather than dynamic, type, the problem is not too difficult to solve in a reasonably acceptable manner. Slides and film-strips are typical of static visual presentation. In such cases, the progression of the medium required for any given time of presentation of a sequence of instruction material to the student is small. The time for required back-and-fourth motion of such media past intervening sequences representing substantial presentation times is readily made so small as to be negligible, and this type of approach, more or less approximating randomness of access, has been used in a number of prior art devices employing such media, typified by that shown in Nickl et al. Patent 3,103,073.

The provision for branching in the case of tape-recorded audio material (whether used alone or in synchronism with slides or films-strips) appears in principle to be more difficult. However, the information-skipping or semi-random-access approach is in fact highly practical, because even relatively inexpensive tape-recording equipment is provided with fast forward and reverse speeds moving the tape at a large multiple of the reproduction speeds, and even higher speeds are readily obtained in specially designed machines. The gaps in reproduction introduced by skipping of reasonable amounts of material may be made almost unnoticeable to the student.

It is of course well known that the medium of motion-pictures, and particularly sound motion-pictures, has great advantages over other media for instruction purposes. Nevertheless this medium, although in widespread use for other educational purposes, has found relatively little use in programmed teaching devices. The reason for this is believed to lie primarily in the problems associated with provision for branching which have been recognized and solved by the present invention.

Unlike the cases of the other media just discussed, satisfactory branching operation is difficult to achieve with motion-picture film by merely inserting the auxiliary sequences required by certain students between portions of the main or normal series of material, to be omitted when not required. The reasons for this are both mechanical and psychological. As regards the mechanical aspect, it is difficult to design a projector system capable of the high ratios of "fast" speed to ordinary operating speed which may be obtained with a tape recorder, and the few machines which have been designed for "random access" to film portions have been very expensive and of questionable ruggedness. The psychological factor is the small tolerance for gaps in presentation which is necessarily associated with the choice of this medium for its life-like qualities. In the case of static visual displays, there normally exists a blanking out during the change-time in any event, and the blanking out of the screen for a slightly larger interval, if perceptible at all, is not greatly objectionable. Similarly, a reasonable interval of silence in an audio program is readily taken as a matter of course, gaps in this type of sensory information being readily distinguishable from pauses normally occurring in the recorded information only in the presence of high tape noise, which disappears when the reproduction is interrupted for skipping of material. The blanking of a motion-picture (or videotape) screen for any appreciable interval, however, is found to introduce an element of performance which not only destroys the illusion of reality which is one of the reasons for choice of the dynamic visual medium, but frequently creates affirmative objection by students to long-term use of such a machine.

Various attempts have been made to deal with the problem of providing fully satisfactory branching-program teaching using motion-picture film as the recording medium. In one type of approach, the teaching program is recorded on a plurality of separate films, independently driven. Such a system has been employed in educational experimentation, but the obstacles to widespread use are apparent. In another approach, the auxiliary material is recorded between portions of the main series, as discussed above, but there is recorded on a parallel image track an alternate sequence which is reproduced in the event the auxiliary material is not required by student responses. In certain cases, this alternate track may be made to serve some actually useful purpose for the student who does not require the auxiliary material. However, even in such cases, it is subject to the objection that a student who answered incorrectly is deprived of useful material. The preparation of a program for such a machine thus requires, even at best, a choice between wasting of the time of the better student (and film information space) and omitting useful material from the presentation to the slower student, the former being normally unavoidable.

The present invention, like systems just mentioned, employs a multi-track film format. In the present invention, however, the auxiliary visual information which is presented when required appears on two or more tracks sequenced in opposite directions on the same longitudinal portion of the film to form a "loop" which both commences and ends at the point where the main series is interrupted for its presentation. The commencement of the succeeding portion of the main series is at the same longitudinal point of the film (normally, but not necessarily, on the same track). If student responses have shown no need for auxiliary instruction, the film proceeds in the same manner as if the branching provision were absent. If student responses have shown the need for auxiliary instruction, the film is moved first in one direction and then in the other (with appropriate switching of track selection) along a path which brings it back to the same point, with no substantial interruption whatever in the presentation, which is externally closely simulative of the reproduction of an ordinary film bearing all the information presented in usual forward sequence.

Obviously, the principle of operation just described may of course be implemented in a variety of ways, and may be used for a variety of the purposes for which auxiliary material is inserted in a main teaching sequence. However, the invention further affords a number of particular manners of most advantageous use of the principle. These may be best understood by reference to the particular embodiments shown in the drawing and described below.

In the drawing:

FIGURE 1 is a diagrammatic representation, in isometric perspective, of an audio-visual teaching machine and film cartridge for use therewith suitable for use with the present invention;

FIGURE 2 is an enlarged fragmentary view of a dual-track sound-picture instructional film made in accordance with the invention;

FIGURE 3 is a fragmentary view of a modified form of the film of FIGURE 2;

FIGURE 4 is a schematic block diagram of the film-drive control system of the teaching machine of FIGURE 1;

FIGURE 5 is a schematic representation of the image sequence of the film of FIGURE 2;

FIGURE 6 is a schematic representation of an image sequence of a three-track film;

FIGURE 7 is a further schematic representation of an image sequence of a three-track film;

FIGURE 8 is a schematic illustration of a four-track film format which has particular utility in connection with the invention; and FIGURE 9 is a schematic representation of an exemplary image sequence on a four-track film.

As an exemplary embodiment of the invention, FIGURE 1 illustrates an audio-visual teaching machine, generally designated 10, which in external respects is similar to teaching machines currently known. The illustrated embodiment includes a suitable housing 12 provided with a viewing screen 14 and containing suitable film-feeding, projection, and sound-pickup and amplification devices for optically projecting a motion-picture film image on the screen 14 and reproducing audio information carried by the film through a loudspeaker 22 or a private headset coupled to jack 26, together with a presentation control system hereinafter to be described. The exemplary machine 10 shown has conventional sound-projector operating controls 20 for on-off, volume, focusing, framing, etc. The front panel additionally has "Answer" buttons 30 for entry of student responses as well as a "Repeat" or "I Don't Know" button. The "Answer" buttons illustrated are limited to a True-False or multiple choice answer selection, but may of course be alpha-numeric, permitting programs requiring the student to spell or otherwise construct a response of his own determination. As illustrated, the machine has a loading aperture 34 accepting a cartridge 36 containing the reel 38 bearing the film, the latter either being of the type providing endless repetitive operation, or of the conventional type requiring rewinding.

FIGURE 2 illustrates a novel film for use with the machine in accordance with the present invention. The film 50 has two independent image tracks, disposed as parallel rows 52, 58 of consecutive frames. The track 52 bears a main instructional sequence consisting of a series of lessons, each followed by a question. The arrow 54 indicates the direction of sequencing of the film, i.e., the ascending order of progression past the point of reproduction. (It will be noted that in FIGURE 5, referred to later, the arrows indicated the direction of motion of the film past the fixed reproduction station, and the arrows there illustrated as designating the progression direction of the row 52 accordingly extend in the opposite direction from the arrows 54 of FIGURE 2.)

The main series track 52 is sequenced in the usual forward direction and bears lessons in end-to-end relation. Each lesson consists of expositional instruction material ($L_1$, $L_2$, etc.) followed by questions ($Q_1$, $Q_2$, etc.) testing the student's knowledge and comprehension. The expositional or instructional material $L_1$, $L_2$, etc. is in conventional motion-picture sequence, but may include frames designed for single-frame static display, often used to avoid consumption of substantial length of film for subject-matter for which dynamic projection has no real advantage, many of which frequently occur in the course of a presentation, such as maps, charts, drawings, etc. The mere stopping of film progression for such purposes obviously does not constitute an interruption of the visual presentation, and such "stills" are a part of the motion-picture sequence for present purposes.

The questions, as seen in the drawing at $Q_1$, each occupy a sequence of frames. Such a sequence is obviously necessary where the question itself is dynamically presented, for example in the case of oral interrogation by an instructor shown in the film. Occasionally, where the actual interrogation is statically displayed, directions in dynamic form may precede it which are "instructional," but only in the sense of directing the student to perform external operations required in preparation for response. Such directions or instructions are of course part of the learning test portion Q, rather than part of the expositional material L.

Irrespective of whether a portion of the question sequence is presented dynamically, it should normally terminate in a static or single-frame display at which progression of the film is stopped for the entry of answer by the student. To minimize the accuracy required of the projector mechanism, the single-frame information is desirably repeated identically on a number of frames, so that a tolerance for variation in deceleration is provided, image-centering braking thus being permitted at any of a number of frames.

Between each question $Q_1$ and the expositional material $L_2$ of the next lesson, there is interposed a review or reinforcement sequence which includes repetition of the correct answer to the question. This review or reinforcement material is schematically shown as a single frame $R_1$ in FIGURE 2, to indicate brevity, but is normally a dynamic frame sequence. Such repetition of correct answers, in addition to serving the "reinforcement" function for which it is commonly used in linear programs, also serves an additional purpose to be later mentioned. For purposes of the present invention, the reinforcement material (although identified by a subscript numeral corresponding to the preceding lesson) constitutes in essence the first portion of the expositional material of the next lesson.

The track 58 bears correctional or remedial material $C_1$, $C_2$, etc., sequenced backwardly on the film, i.e., in the direction opposite the portion of the main lesson series to which it pertains. This material extends continuously and uninterruptedly along part or all (except the first portion R) of the expositional material. As hereafter seen, the correctional or remedial material $C_1$ or $C_2$ is, in the illustrated embodiment, the first half of an auxiliary branch, of which the second half is provided by repetition of the corresponding portion of the main lesson series. Accordingly, one frequent content consists of the explanatory material which would be given by a human instructor prior to such a repetition, such as reminders of key background imparted by previous lessons, and items of which the student should take particular note in the re-presentation of the lesson material. The correctional material may also typically include a more detailed explanation of certain salient portions of the exposition of the main series which is not required for comprehension by more apt students. Single-frame information may of course be included if appropriate (preferably with the redundant duplication already mentioned). However, this portion should normally contain no questions directed to the student for which the entry of answers is required, with limited possible exceptions. These exceptions lie primarily in questions which are not inserted for test of learning by normal students, but for other purposes. As one example, a question may be inserted which is so simple that an incorrect answer can be made only by inattentiveness, so that an incorrect answer may be used for an appropriate signal to the student or to a teacher. Other examples of questions having purposes other than as learning tests exist, such as simple practice questions which are designed to impart learning, rather than test learning, by the answer entry. It will be understood that questions of these types, although interrogatory in form, are not learning tests, but parts of the expository material, for purposes of the present invention, and may appear anywhere in the expositional material without affecting utilization of the present invention. A learning test should be inserted in the correctional material (in this embodiment) only for purposes of shortening the auxiliary material inserted, i.e., where a correct answer indicates the auxiliary material may be foreshortened, for example where a brief reminder has sufficed to prepare the student for repetition of the question.

The visual image track 52 has an associated audio track 56, magnetic or optical, shown in FIGURE 2 as extending along one marginal edge of the film strip outwardly of the sprocket holes 66, and a corresponding audio track 60 is provided for the visual image track 58. An auxiliary magnetic or optical track 64 is provided for other information, for presentation to the student or otherwise. For example, this audio track may be used in connection with a "Repeat" or "Reverse" button provided for optional use by the student, and may contain oral information for delivery during reverse movement with a blank screen, such as exhortation or encouragement preceding complete repetition of an entire lesson, or information indicating to the student how far he is going back in his reverse operation. Similarly, this track may be used in connection with a "by-pass" control, sometimes provided where the student is to be permitted to override the program sequence in determining at what point his use of the program should commence.

In the alternative form shown in FIGURE 3, a further audio track 68 is provided on the film 70. This appears in alignment with the sprocket holes 66, and a corresponding audio track on the other side of the film may also be provided. The effect of the sprocket-holes on playback may be minimized by employment of frequency-selective attenuation filters for the fundamental and harmonic frequencies generated by the sprocket holes at the speed which is used in the playback.

The correct answers (and weighting of incorrect answers, if desired) to learning-test questions are encoded on any of the audio tracks, superimposed as pulses of inaudible frequency where the same track is simultaneously used for oral information to the student. Similarly, code commands as to stopping for single frame display, for learning tests or otherwise, and change of drive direction, are recorded on the film.

FIGURE 4 shows, in basic schematic fashion, a control system employed with the film of FIGURE 2 or FIGURE 3. The film drive mechanism 72 has forward, reverse, and stop signal inputs 74, 76 and 78. The coded information on the film is detected by a suitable detector 80. This same detector is of course used in connection with stops for single frames, with suitable timer or other restarting provision, but the illustration of FIGURE 4 is confined to portions of the control system most closely relevant to the present invention, for simplicity of understanding. It will also be understood that the detector is suitably equipped for required selection of magnetic or optical tracks employed for the coding of various information. As shown by legends in FIGURE 4, the output of the code detector provides the correct answer information for the forthcoming question during the presentation of lesson L, and actuates the drive stop 78 upon presentation of the question Q. There is also provided an image track selector 82, for which many mechanisms are well-known, some actually shifting the film with respect to the projection lens, and others merely altering an optical path to change the track projected on the screen. In FIGURE 4, the condition for normal or main series track exhibition is designated as 1, and for remedial or corrective track exhibition as 2.

The student-answer keys 30 and the register or storage for the coded correct answer 84 are compared in any suitable comparator equipment or circuit 86. A comparator output indicative of "Right" answer is fed to the forward input 74 of the film drive. A comparator output indicative of "Wrong" answer is fed to the reverse input 76 and also actuates the selector 82 to exhibit the corrective track. As further indicated by a legend in FIGURE 4, the film code detector 80 produces, at the end of the corrective sequence C, actuation of the forward input 74 of the film drive and restoration of the presentation of the main lesson series track. Such auxiliaries as recording of student scores (weighted or otherwise), etc., are omitted from the drawing and present description.

The cycle of operation produced by the system of FIGURE 4 is shown in FIGURE 5. The motion of the film is here shown vertically for simplicity of understanding, this being the orientation conventional in unidirectional projectors and thus most familiar. The two-track operation is, for similar reasons, illustrated by showing directions of motion of the film with respect to a fixed projection point, shown dotted. Reference has already been made to other known provisions for track-changing, which are often much simpler in actual construction.

The sequence of operation shown in FIGURE 5 commences with the presentation of the reinforcement or review material regarding the previous lesson, designated $R_0$ and constituting the first portion of the expository portion $L_1$, shown as progressing past the projection point in the position arbitrarily selected for illustration.

At the end of the lesson $L_1$, the question $Q_1$ is presented, and the film drive is stopped, the correct answer to the question having been read out and stored during the lesson in the storage or register 84. A correct answer on the student answer buttons 30 produces forward actuation 74 of the film drive, and the next lesson $L_2$ (including the reinforcement material $R_1$) is then presented. If the comparator 86 indicates the student answer as being wrong, reverse actuation 76 of the film drive is produced along with shifting to the corrective track. At the end of the corrective material $C_1$, the original or main series track is again projected and forward drive reestablished. The portion of $L_1$ from the point of this occurrence to its end is then repeated to the student, and terminates in a second presentation of the question $Q_1$.

It will thus be seen that upon the entry of a wrong answer, there is presented to the student substantially uninterrupted and continuous supplemental visual (and audible, except during single-frame exhibition) material, consisting in part of material recorded on the film distinctly from the main lesson sequence, and in part of repetition of a portion of the main lesson sequence, terminating in repetition of the question which was originally erroneously answered. Externally, the continuity of presentation upon entry of a wrong answer is in all respects much the same as in the case of a right answer. The shift of tracks and reversal of direction at the end of the backward presentation is readily made sufficiently fast to introduce no discontinuity other than an instantaneous flicker. Upon the making of a correct answer thus enabled, the normal or main series of progression is recommenced.

As in any programmed teaching, the possibility that the lesson will still not have been sufficiently learned after presentation of the auxiliary "loop" must be contemplated. Branching programs are of course designed to avoid such occurrences where possible, not only because of limitations imposed by a machine, but also because it is generally believed that the inability to make correct answers, particularly after presentation of supplemental material, may be detractive from the learning process, i.e., that the learning process is carried out most efficiently, for any given student, with questions which the preceding expository material normally enables him to answer correctly, but for which the expository foundation does not too greatly exceed that which is required for this purpose, so that the comprehension of the first presentation of the main lesson series sufficiently for entry of correct answers is a constant challenge, but not so difficult that reasonable supplemental instruction should fail to suffice for occasional incorrect answers. Where it occurs, however, continued inability to give the correct answer may make it necessary to seek external aid, such as consultation of an instructor or text or other reference material.

Where affirmative evidence of full understanding of each lesson is considered indispensible the system of FIGURE 4 may be accompanied by suitable provision for termination of the operation, with appropriate advice to the student, after repeated efforts have shown continued inability to reach the answer. However, an alternative type of program command may treat the second or third wrong answer as if it were correct as regards reinitiating forward progression (normally with some record of the repeated error, by appearance in a test score or otherwise), and convey the correct answer in the reinforcement material R, relying on the student to determine when his failure to grasp basic material is making further progress without aid undesirable, or terminating the operation on another such occurrence. Frequently, the presentation of the reinforcement material is fully sufficient to apprise the student of the nature of his error and permit unimpeded progress thereafter.

The selective presentation of auxiliary material, even with the simple two-track system, need not necessarily be confined to that given immediately upon making of the incorrect answer. Auxiliary presentation may be inserted directly in the first presentation of expository material, where the need for this is shown by the answers of the student made to earlier questions. As a simple example, the comparator 86 will normally be accompanied by a suitable recording or scoring device. In preparation of the program, auxiliary loops (distinct information in reverse sequence followed by repetition of the corresponding part of the main series) may be incorporated at all of the points where lesser-qualified students are likely to have difficulty, and these loops may be selectively introduced in the program under the control of this scoring device, such material being displayed to students as to whom the need is shown by results on the earlier lessons, without the necessity of awaiting further wrong answers. Thus the main lesson series is itself adapted in length and content to the individual need. Numerous other utilizations of the branching facility, some corresponding to uses of branching heretofore made, and some enabled for the first time by the present invention, will readily be devised by those composing motion-picture type teaching programs and equipment for their presentation.

It will be obvious from study that the continuous forward longitudinal path of the main lesson series need not always be along the same track, occasional interchange of lateral positions of the main and corrective image paths being possible if so desired.

The branching capability of the embodiment thus far described is of course relatively limited, although it achieves the basic purpose of providing a very simple manner of altering the presentation in accordance with student responses. For many purposes, the simple two-track arrangement will suffice. However, it will be seen on study that this simple form of branching is more or less restricted to programs designed for students with generally similar capacity for absorption of the subject-matter of the program. In many cases, it is desirable to have provision for further branching capability.

Obviously, the principle of the invention can be extended, and programming made much more flexible, by employment of further image tracks. Indeed, as will now be seen, embodiments of the invention employing a film containing at least three tracks may be advantageous even for programs in which the limited continuous-presentation branching already described is fully adequate.

FIGURE 6 shows, in schematic form similar to FIGURE 5, a three-track film having forward and reverse main lesson series tracks 88 and 90, with a common track 92 used for remedial or corrective material relating to the lesson sequences of each. Although the track 92 is shown as being centrally located, it will be obvious that this position is merely convenient, and, again, that interchange of lateral positions of the tracks along the length is of no great consequence. Although track-switching in the midst of sequences recorded in the same direction normally has no purpose, and introduces the slight instantaneous flicker earlier mentioned in connection with direction reversal, such an alteration obviously does not represent a departure from the essential teachings of the invention.

The main tracks 88 and 90 of FIGURE 6, considered as linear information tracks, find an analog in two-track motion-picture systems heretofore known, being sequenced in opposite directions so that the film may run to the end, reverse, and be restored to the original storage reel upon conclusion of presentation, thus eliminating the necessity for rewinding. In the embodiment of FIGURE 6, the added track 92 serves the function of the track 58 of FIGURE 2 for both of the main information series tracks. It will be noted that the two track system of FIGURE 2 will in general leave substantially unutilized portions of the auxiliary track. The addition of the third track 92, in addition to permitting restoration of the film to the original reel upon completion, permits the meshing of the non-repetitive portions 93 and 95 of the auxiliary loops to increase the efficiency of film utilization.

FIGURE 7 shows an embodiment illustrative of one manner of use of the invention with three-track film bearing a single main series track. Obviously, one use of such film (not illustrated) is the mere addition of a further loop generally similar to that of FIGURES 2 and 5, either for use in connection with a second incorrect answer or for alternate use dependent on which incorrect answer was entered. In FIGURE 7, as previously, the main series 98 is shown as solid lines (except for dotted lines added to show track-shifting). A non-repetitive branching loop 94 is employed. As will be readily seen, where the branching loop is non-repetitive, employing two tracks apart from the main series track, it may proceed in either direction from its point of commencement, to which it later returns. Its length is restricted only by the prohibition of running in either direction past the points where other loops branch from the main series, and the relative amounts of film space used for auxiliary material for the various lessons are essentialy independent of the relative length of the lessons themselves. Further, as shown in FIGURE 7, where a gap appears between auxiliary loops, as at 94 and 96, the main lesson track 98 may incorporate a reentrant "fold" producing substantially full utilization of the area of the film.

FIGURE 8 shows a film 100 incorporating a four-track construction of a type which is particularly desirable for use in the device of the invention. Here the four tracks are formed by dividing relatively large overall single frames (i.e., progression steps of the film) into four quadrants $T_1$, $T_2$, $T_3$ and $T_4$, thus forming side-by-side rows 102 and 104 of image frames, each row bearing two interlaced independent tracks. In the illustration, tracks $T_1$ and $T_2$ are indicated by arrows to be sequenced in the forward direction, while tracks $T_3$ and $T_4$ are shown as being sequenced in the backward direction. It will be understood from what has already been said that maximum utilization of the present invention does not necessarily involve identification of any track as being "forward" or "backward" throughout its length on the film; a particular geometrical portion of the film constituting a track may be sequenced for forward progression in some longitudinal portions and backward progression in other longitudinal portions. This is particularly true as the number of tracks on the film increases, producing corresponding increase in branching capability. As will be obvious, the loop-type branching of the present invention may be intermixed with branching provisions of the prior art in a given film program. As one example, particular questions of a program may call for answers which are neither wrong nor right, but the answer may select between alternate main series for all or a portion of the balance of the film, the answer demonstrating, for example, that one type of exposition is more meaningful to the particular student than another type. In such cases, there are effectively formed alternative main series, since in such a case none of the information is properly characterized as auxiliary. A region of the film carrying four such tracks of course has all four sequenced in the same direction, while a region having three such tracks may use a common fourth track for the introduction of the auxiliary loops of the present invention. Accordingly, the directional distribution of the four tracks of FIGURE 8 should be considered as merely illustrative.

FIGURE 9 shows merely one of many ways in which the flexibility of the four-track provision can be utilized in connection with the invention. Here a first wrong answer at Q at the end of lesson L in the main series 106 produces a loop 108 commencing with the corrective information C and terminating with repetition of the lesson L, as in the two-track embodiment. Upon a second incorrect answer at Q, the loop 110 is shown with supplemental corrective information SC, and the question again repeated. There are a large number of variants in use of the invention. For example, the restriction against including learning tests in the non-repetitive portion of the auxiliary loop in the two-track embodiment is removed in the four-track construction. Such a question may be incorporated in the material shown at C, for example just before repetition of the lesson, and a sub-branching loop may be inserted if sufficient preparation for the repetition is not shown to exist yet. Because loops such as SC may now extend in either direction from the question, the use of tracks for such secondary branching (a loop annexed to a primary branch) still permits the presentation of a second primary auxiliary information loop if the question is answered wrongly again the second time. It will also be seen that if so desired the four tracks may be used in a manner more or less analogous to that of FIGURE 6, i.e., with halves (approximately) of the main series running in opposite general directions (folded where useful for full film utilization), with two tracks employed for forming partially-repetitive and non-repetitive auxiliary loops for both halves of the main series, and with the film fully rewound on completion.

Extension of the discussion of the variety of branching possibilities which can be introduced without interruption in the dynamic visual presentation is believed unnecessary.

It will be seen that increase of the number of available tracks not only greatly aids the flexibility of preparing programs, but also contributes to full utilization of the area of the film.

Obviously, the features of performance just discussed can be obtained with four parallel tracks, rather than employing the interlaced format of FIGURE 8. However, this format is highly advantageous in maintaining the small duration of the blanking during track-switching which characterizes the simple two-track format of FIGURE 2. With ordinary parallel tracks, switching must in general be accomplished by motion of a single member or assembly. Although switching mechanisms, such as mirrors or prisms, may be designed for action so rapid as to make differences in switching time of little importance in affecting the appearance of flicker during switching, the problem of providing fully accurate indexing at the required switching speeds can become difficult, since it is a necessary requirement for satisfactory operation that the images be exactly centered on the screen. With the format of FIGURE 8, track switching may be accomplished by separate mechanisms for each of the two coordinates, the only indexing required being the end-stops of the mechanisms employed. Similar interlaced format can be used for greater numbers of tracks, the division of track-selection motion into independent motions in two coordinates being highly useful in maintaining the absence of flicker. As the number of tracks is multiplied, the importance of variations in distance between tracks increases. It will be observed that a nine-track system (3×3 format) permits essentially the same access time from the central track to any of the others as in the case of a mere two-track system, while only two intermediate indexing locations must be kept in proper alignment (a relatively simple matter in the case of mere end-stops).

The invention has herein been described in connection with motion-picture film. However, it is of substantially equal utility with other media for dynamic visual presentation, such as videotape. Although of lesser advantage in the case of static visual media, it may also be employed with these where lesson sequences are sufficiently long, and branching of sufficiently complex nature, so that the semi-random access now used in such systems introduces excessive time and complexity. For example, any of the basic formats here described in connection with motion-pictures can also be used with static film-strips. Further, where the medium is a large group of slides, each slide may have side-by-side images, the tracks being formed by corresponding images on successive slides. Other forms of visual media in which gaps in presentation are objectionable may also be adapted to incorporate the invention.

The invention has herein been described in terms of questions to which answers are made by operation of answer buttons or a keyboard. It will be obvious that "questions" are merely one form of learning-test stimuli and "answers" merely one form of response. The invention obviously can be applied to teaching machines employing other forms of learning test and response entry, such as (to select arbitrary examples from an infinity available) a machine displaying movies of a driver's view, with responses by manipulation of simulated automobile controls, and branching for practice on particular driving situations, or a machine displaying movies of an instrument panel, with responses by manipulation of simulated process-controls, and branching for instruction as to theory.

Persons skilled in the art will readily adapt the teachings of the invention to devices substantially differing in detail from those illustrated in the drawing and described above. Although a number of uses and variants have herein been set forth, the diversity of manners of the employment of the invention is obviously much greater than the examples herein discussed, by reason of the diversity of teaching tasks and visual teaching devices. Accordingly, the scope of the protection to be afforded the invention should not be limited to the particular embodiments herein described, but should extend to all practice of the invention within the definitions of the appended claims, and equivalents thereof.

What is claimed is:

1. A teaching device comprising:
  (a) an information-storage medium of the type adapted for sequenced visual presentation of information upon progressive sensing of the medium,
  (b) a series of lessons recorded on the medium, each lesson comprising an expositional portion followed by a knowledge test portion presenting an output stimulus having correct and incorrect responses, correct-response information being recorded on the medium but concealed from the student upon presentation of the stimulus,
  (c) and branching expositional sequences associated with lessons and at least partially distinct therefrom, recorded on the medium for presentation,
  (d) the medium having a plurality of parallel information tracks longitudinally along said medium for selective utilization of alternative information on the portion of the medium to be sensed,
  (e) the commencement of each lesson being at the end of the preceding lesson to form a substantially continuous and uninterrupted progression sequence,
  (f) the branching sequences including auxiliary expositional information at least partially on tracks sequenced in the directions opposite the directions of sequencing of the lessons to which they pertain, each branching sequence commencing at the end of the lesson to which it pertains and extending substantially continuously and uninterruptedly along tracks sequenced in opposite directions and terminating at the point of commencement.

2. A teaching device as described in claim 1 further characterized by:
  (g) the initial portion of each branching sequence being on a track sequenced in the direction opposite the lesson and the remainder of the branching sequence being the terminal portion of the lesson.

3. A teaching device as described in claim 1 wherein the medium is plural-track motion-picture film.

4. A teaching device as described in claim 3 wherein the film has a plurality of side-by-side rows of image frames, the frames in each row bearing a plurality of interlaced independent image tracks, the tracks thus formed bearing a plurality of such branching sequences for the lesson.

5. A teaching device as described in claim 1 in combination with means for entry of student response and means responsive thereto to present the next lesson sequence upon a correct response and to present a branching sequence upon an incorrect response, said latter means including coded information on the medium indicative of correct answers and of the points of track-change and reversal of progression.

6. A teaching device as described in claim 1 having at least three tracks.

7. In a branching-program teaching device having
  (a) a visual reproduction station adapted for output visual presentation of lesson sequences recorded on a forwardly-sequenced track of a reproduction medium together with response-demanding learning tests at the terminal portions of respective lesson sequences,
  (b) mechanical means for selectively progressing the reproduction medium through the reproduction station in forward and reverse directions,
  (c) response input means operable by the user to enter responses as demanded by the learning tests,
  (d) means responsive to correctness of the response to a learning test to initiate the reproduction of the next lesson sequence, (e) and means responsive to incorrectness of the response to a learning test to reproduce auxiliary material recorded on auxiliary tracks on the medium, the improved construction characterized by:

(f) the aforesaid means to present auxiliary material comprising means responsive to incorrectness of a response to progress the medium in successive opposite directions along a path of equal aggregate length in both directions, and track-selection means associated with the reproduction station and operating with the progressing means to select and reproduce visual tracks sequenced in the successive directions of motion to provide substantially continuous reproduction, so that the presentation of the auxiliary material is essentially immediate and uninterrupted and free of extraneous mechanical operations, and substantially the entire progression of the medium is at all times directly utilized in presentation.

8. The improved teaching device of claim 7 wherein the means to present auxiliary material comprises means to move the medium in the backward direction while presenting an information channel on an auxiliary track progressing in that direction, and means for then reversing the motion and repeating at least the end portion of the original lesson-sequence presentation.

9. The improved teaching device of claim 7 comprising a sound-film motion-picture projector having means for sensing and responding to control signals recorded on the film.

10. In the method of preparing instruction material comprising the steps of recording on a visual reproducing medium a main progressive series of instructional material intermixed with learning test stimuli, together with supplemental material for optional inserted presentation dependent upon student responses, and thereafter reproducing the main series and such supplemental material as is required by student responses by progression of the medium through a reproducing station, the improvement comprising:

recording the main series in substantially continuous sequence on the medium, recording at least a portion of the supplemental material on at least one auxiliary recording track commencing at a point of progression of the main series with at least a portion sequenced in the direction opposite that of the corresponding portion of the main series, and selectively inserting the supplemental material in the usual presentation of the main series by progressing the medium in successively opposite back-and-forth directions to conclude the supplemental material at substantially the point of its commencement.

11. The method of claim 10 wherein the medium is multiple-track motion-picture film.

12. The method of claim 10 wherein the medium has at least three visual information tracks, so that the length of the supplemental material is independent of the length of the lesson to which it pertains and the recording capacity of the medium may be substantially fully utilized.

13. The method of claim 10 characterized by recording the initial portion of the supplemental material on a track sequenced in the direction opposite that of the main series and extending back along a portion of the main series, and presenting the supplemental material by progressing the medium backwardly to present said initial portion of the supplemental material and then progressing the medium forwardly to repeat said portion of the main series.

14. A method of teaching with plural-track motion-picture film comprising:

(a) projecting a main sequence of instructional material recorded on at least one track of the film along a path substantially uninterrupted in longitudinal progression of the film, (b) and selectively inserting supplemental material in accordance with individual student need by changing to tracks other than those of the main sequence at predetermined points of progression of the film and thereupon progressing the film in both directions by equal aggregate amounts while projecting supplemental material recorded on a substantially uninterrupted path extending along at least two tracks sequenced in the respective directions to return to said predetermined points of progression and then resuming projection of the main sequence.

15. A sound-motion-picture system for use in teaching comprising:

(a) a sound-picture projector for multi-track film having track-seletcion and direction-selection means, said film having a plurality of longitudinal tracks, (b) means including a code detector responsive to encoded response information on the film to read out correct student response to test stimuli on the film, (c) means for entering student responses to test stimuli, (d) means responsive to incorrect student responses to actuate the track-selection and direction-selection means to initiate reproduction of an auxiliary information track, (e) and means including said code detector responsive to coding on the film and independent of student responses to further actuate the track-selection and direction-selection means to progress the film in successively opposite directions on different tracks and return to the progression point of the first actuation while substantially continuously projecting images from the film.

References Cited

UNITED STATES PATENTS

| | | | |
|---|---|---|---|
| 2,299,738 | 10/1942 | Collins | 178—5.6 |
| 2,514,578 | 7/1950 | Heller et al. | 179—100.2 |
| 3,191,315 | 6/1965 | Hannah | 35—9 |
| 3,248,164 | 4/1966 | Wells | 352—83 |

EUGENE R. CAPOZIO, *Primary Examiner.*

W. W. NIELSEN, *Assistant Examiner.*